United States Patent [19]

Chatterjee et al.

[11] Patent Number: 4,960,617
[45] Date of Patent: Oct. 2, 1990

[54] POST-REACTOR STABILIZATION OF POLYOLEFINS

[75] Inventors: Ananda M. Chatterjee; Dale J. Wilpers, both of Houston, Tex.

[73] Assignee: Shell Oil Company, Houston, Tex.

[21] Appl. No.: 331,761

[22] Filed: Apr. 3, 1989

Related U.S. Application Data

[62] Division of Ser. No. 161,873, Feb. 29, 1988.

[51] Int. Cl.$^5$ .............................................. B05D 7/00
[52] U.S. Cl. .................... 427/222; 427/316; 427/385.5; 427/393.5; 427/416; 427/419.2; 427/419.7; 427/424; 427/425; 427/427
[58] Field of Search ............... 427/222, 316, 385.5, 427/393.5, 416, 419.2, 419.7, 424, 425, 427

[56] References Cited

U.S. PATENT DOCUMENTS

| | | | |
|---|---|---|---|
| 3,271,185 | 9/1966 | Pollock | 117/100 |
| 3,546,150 | 12/1970 | White et al. | 260/28.5 |
| 3,591,409 | 7/1971 | Aubrey et al. | 117/100 C |
| 3,971,749 | 7/1976 | Blunt | 260/33.4 |
| 4,452,928 | 6/1984 | Trischman et al. | 523/206 |
| 4,517,246 | 5/1985 | Matsuyama et al. | 428/407 |

FOREIGN PATENT DOCUMENTS

0200684  4/1986  European Pat. Off. .
1166366  8/1969  United Kingdom .

OTHER PUBLICATIONS

H. S. Hall & R. E. Pondell, Chapter 7, "Controlled Release Technologies: Methods, Theory & Applications", vol. II, A. F. Kydonieus.

Primary Examiner—Bernard Pianalto

[57] ABSTRACT

The present invention includes a coated polyolefin particle and a method for post-reactor stabilization of polyolefins comprising:

melting a polyolefin wax;

blending at least one additive into the liquid polyolefin wax;

fluidizing polyolefin particles to be stabilized with a hot gas;

spraying the liquid polyolefin wax containing at least one additive on the fluidized polyolefin particles, and forming at least partially coated polymer particles;

maintaining the at least partially coated polymer particles and fluidized polyolefin particles at a temperature which is sufficiently high to prevent the formation of fibers from the wax and which enhances the formation of stabilized polymer particles.

11 Claims, No Drawings

POST-REACTOR STABILIZATION OF POLYOLEFINS

This is a division, of application Ser. No. 161,873, filed Feb. 29, 1988.

FIELD OF THE INVENTION

This invention is generally concerned with a method of producing stabilized or additive-containing polyolefins which do not need extrusion pelletization. This invention is concerned with novel coated polyolefin particles, which can be directly sold to customers without pelletization.

The present invention also relates to an improved process for incorporating (after the polymerization reaction) stabilizers and other additives into polyolefins, in particular, a process for incorporating additives like antioxidants into polypropylene (PP), therein reducing the cost and the steps currently required for adding stabilizers and additives to polyolefins. The novel method for adding stabilizer after polymerization allows incorporation of the additive into the polymer in such a way that further extrusion pelletization of the polymer can be eliminated and a stabilized polymer results, in particle form.

BACKGROUND OF THE INVENTION

In this invention, the polyolefin is coated with a blend of an additive and a polyolefin carrier or vehicle. Relatively low molecular weight of the carrier resin is preferable.

The method traditionally employed for incorporating dry additives into polymers involves blending the polymer with the additive, using an extruder, Banbury mixer or other mixing apparatus. Disadvantages of the current techniques include appreciable downtime for cleaning of the blending equipment, high electricity costs of running the extruders, and maintenance costs.

A variety of patents teach methods for blending additives with polymers. For example, U.S. Pat. No. 3,591,409, teaches a method for preparing a composition by high intensity mechanical blending of a mixture of particulate thermoplastic resin, hydrocarbon wax, and particulate solid material at high temperatures. This teaching requires that all ingredients be placed in the mixer at once, without separate pretreatment of any one of the components of the mixture.

In contrast with this conventional teaching, it has been discovered that a formulation can be prepared which consists of additives and a molten polyolefin carrier; the mixture can be sprayed onto the polymer particles (to be stabilized) through a fluidized bed coating technique, wherein the polymer is partially coated and discrete particles are formed.

A U.S. Pat. No. 3,271,185 to Phillips Petroleum Co. discloses a process for stabilizing polymers wherein a vaporizable antioxidant is added in a fluidized bed to the polymer.

Japanese Patent No. SHO[59]-150719 is directed towards a process where polypropylene is mixed at a high velocity with a stabilizer whose melting temperature must be below 162° C.

A U.S. Pat. No. 4,452,928 to El Paso Polyolefins Co. discloses the use of solvents which must be removed after adding the stabilizer to the polymer. The teaching suggests that the polymer be purified and the solvent recycled to obtain good benefits from the disclosed process.

A European Patent, No. 200,684 to Ciba-Geigy discloses the stabilization of spherical polyolefins by treatment with emulsion or dispersion containing stabilizers and certain amines. Emulsifiers, such as sorbitan monooleate, are used in the disclosed process. The sorbitan monooleate remains in the resultant polypropylene.

It has long been desired to find a method of cheaply blending additives into polymers without (1) having to additionally compound the polymer with the additive using energy-intensive mixers like extruders, and (2) resorting to a process requiring the use of solvents.

The present invention, directed toward a fluidized bed coating process, has lower energy and capital cost requirements compared to the single or twin-screw extrusion technology, and attempts to provide a new solution to an old problem.

SUMMARY OF THE INVENTION

The present invention relates to a process for post-reactor stabilization of polyolefins comprising:

melting a polyolefin wax;

blending at least one additive into the liquid polyolefin wax;

fluidizing polyolefin particles to be stabilized with a hot gas;

spraying the liquid polyolefin wax containing at least one additive on the fluidized PolYolefin particles, and forming at least partially coated polymer particles;

maintaining the at least partially coated polymer particles and fluidized polyolefin particles at a temperature which is sufficiently high to prevent the formation of fibers from the wax and which enhances the formation of stabilized polymer particles.

In a preferred embodiment, the polyolefin carrier can be a polyolefin homopolymer containing 2-18 carbon atoms in the repeat unit, such as polypropylene.

In a preferred embodiment, the polyolefin (to be stabilized) is a polyolefin homopolymer or copolymer containing at least one comonomer having 2-18 carbon atoms in the repeat unit.

The present invention involves a novel process for adding stabilizers to solid polypropylene particles comprising:

melting a polypropylene wax;

blending at least one additive into the liquid polypropylene wax;

fluidizing polypropylene particles (to be stabilized) with a hot gas;

spraying the liquid polypropylene wax containing at least one additive on the polypropylene particles, and forming at least partially coated particles of polypropylene; and maintaining the at least partially coated particles of polypropylene and fluidized polypropylene particles at a temperature which is sufficiently high to prevent the formation of fibers from the wax and enhances the formation of stabilized polypropylene particles.

The invention also comprises a coated particle having a core of a solid polyolefin, and at least one coating of a blend of an additive and a polyolefin carrier.

DETAILED DESCRIPTION OF THE INVENTION

The present invention involves the formation of a novel coated particle, prepared such that it comprises a core of polyolefin and a coating which comprises a blend of a polyolefin component and a stabilizer component. The coating preferably comprises a polyolefin having 2–18 carbon atoms in the repeat unit and additives such as antioxidants, processing stabilizers, acid acceptors, nucleating agents, metal deactivating agents, thermal stabilizers, light or ultraviolet stabilizers, antiblock agents, antistatic agents and the like.

Within the scope of the invention, it is contemplated that the coated particle comprise an additive which can be one or more of a variety of compounds, including but not limited to those noted above and the following: lubricants, and slip agents which are capable of enhancing the properties and processability of the polyolefin.

Other additives which may be usable within the scope of this invention include:

fillers, such as talc, barium sulfate, clays, calcium carbonate, silicates, and mica;

pigments, such as titanium dioxide, carbon black, lead chromate, cadmium sulfide, cadmium selenide, and zinc sulfide;

stabilizers such as basic lead carbonate, tribasic lead sulfate, basic lead chlorosilicate, dibutyl tin oxide and other salts of lead, zinc, cadmium, tin, and the like;

flame retardants such as antimony oxide; and any other additives which enhance the properties and processability of the polyolefin to which they are to be added. For a typical coated particle within the scope of this invention, the concentration of the additive can range from about 0.01 to about 20 percent of the total weight of the coated particle.

The outer coating of the particle can preferably contain besides one or more of the additives noted above, one or more homopolymer or copolymer having from 2 to 18 carbon atoms in the repeat unit, such as propylene or 1-butene. In preferred embodiments, this outer coating is prepared from one or more of the additives described above, and a carrier polyolefin component. It is preferred that the carrier polymer be a relatively low molecular weight, such as a wax. A wax, such as a polypropylene wax with a weight average molecular weight of 10,000 to 30,000, and which is primarily isotactic (e.g., Hoechst Wax PP230 produced by Hoechst) can function as the outer coating of the coated particle. A polyolefin having at least 2–6 carbon atoms in the repeat unit is most preferred for use in the outer coating, although polyolefins having 2–30 carbon atoms in the repeat unit may be usable herein.

Specific examples of suitable polyolefins usable as the outer coating include polyethylene, polypropylene, polybutene-1, copolymers of ethylene and propylene, copolymers of propylene and butene-1, copolymers of ethylene with at least one other olefin containing from 2 to 18 carbon atoms, and more preferably containing from 2 to 8 carbon atoms; copolymers of propylene (with at least one other olefin containing from 2 to 18 carbon atoms, and more preferably containing 2 to 8 carbon atoms) and copolymers of butene-1 (with at least one other olefin containing from 2 to 18 carbon atoms, and more preferably containing from 2 to 8 carbon atoms).

The polyolefin component usable in the coating layer may be a blend of two or more polyolefins each having 2–18 carbon atoms in the repeat unit, such as a blend of polypropylene and polyethylene, or a copolymer or terpolymer of such monomers.

The selected polyolefin material for the outer coating should not cause color formation, staining, or degradation of the base polymer in which the additives are incorporated. The polyolefin of the outer coating can be left in the final polymer product.

The carrier of the additive, i.e. the wax, may be either of the natural or synthetic type. Typical examples of the carrier which are preferred for use in the coating material include hydrocarbon waxes, such as polypropylene wax, polyethylene wax, and paraffin wax, ester waxes, such as spermaceti, mineral waxes, such as montan wax, amide waxes such as ethylene distearamide and ethylene diresorcinolamide, halogenated hydrocarbon waxes, such as chlorinated paraffin waxes, chlorinated naphthalenes and ketone waxes, such as stearone.

The melting point of the wax carrier should be at least high enough so that the outer coating remains solid and firm at room and storage temperatures. It is preferred that the wax soften or melt at between about 50° C. and about 210° C. for convenience of additive incorporation in the polyolefin particles during post-reactor blending.

Waxes and wax-like materials can be employed alone or in mixtures of various proportions as the carrier of the additive. The most preferred carrier material is isotactic polypropylene wax. The carrier, i.e. the polypropylene wax should be melted before being used for the post-reactor stabilization process. The molten polyolefin wax can then be applied to the polyolefin particles to be stabilized by a spraying or atomization operation.

One or more coatings can be applied to the polyolefin particles through spraying or a variety of other non-extrusion techniques. For example, the polyolefin particles can be fluidized using hot air and then atomized melted wax (containing additives) can be contacted with the particles for time periods ranging from about 0.5 to about 20 minutes. Alternatively, the polyolefin particles can be fluidized using an inert gas, like nitrogen. Additional wax coatings can be added to the at least partially coated resultant particle forming larger sized particles.

The coated polyolefin particles can be kept fluidized with hot air or other gas until the incorporation of additives is complete. It is within the scope of this invention that the fluidized at least partially coated particles can be externally heated.

Good results have been obtained using coatings of polypropylene wax and selected additives on polypropylene particles. The coating material advantageously provides a polymer that is easy to process.

The polymer to be coated, known herein as the core of the particle, can be isotactic polypropylene. Usable base polymers within this invention include but are not limited to: chlorosulfonated polyethylene, ethylene-propylene copolymer rubbers, ethylene-propylene-diene terpolymers; butyl, butadiene-styrene, silicone, acrylonitrile rubbers, and the like. Polyvinyl chloride polymers and copolymers, polyethylene and copolymers, polypropylene, polyvinylidene chloride, polystyrene, polyimides, polyamides, polyacetals, acrylonitrile-butadiene-styrene, polycarbonates, chlorinated polyethylene, polymethyl-methacrylate, polyaromatic sulfones, and the like may also be usable herein. The average size of the core of the particle can range from about 400 micrometers to about 5 millimeters. It is preferred to use cores having an average particle size of 600 micrometers to 3 millimeters.

The novel wax-coated polymer particles are expected to reduce abrasion of the processing equipment by solid additives, and thereby reduce undue wear and erosion of metal surfaces in contact with the final resin composition. Metal contamination caused by abrasion is a serious source of discoloration and degradation of the resins and the use of this novel coated additive reduces the magnitude of this problem.

Coated polymer particles can minimize the dusting tendencies of the polypropylene, and thereby prevent the generation of explosive dusts.

It is contemplated, as within the scope of the present invention, that additional coatings may be disposed on the initially coated particles. The additional coatings can be used to increase the particle size of the polypropylene. Further, meltable stabilizers can be used as a second coating on the particle. Materials such as butylated hydroxytoluene can be used as the second coating within the scope of the invention. Coated particles may join together forming agglomerated particles which may be usable herein. Additionally, a coated particle may become at least partially covered with fines forming a fine covered coated particle which may be used herein.

The invention will be described in greater detail in terms of the examples presented herein below. In no way are these examples intended to limit the invention to the embodiments specifically shown therein. All parts and percentages given are by weight unless otherwise specified.

EXAMPLES

The fluidized bed coating experiments were conducted at Coating Place Inc., Verona, Wisconsin. A schematic and description of the coating process can be found in an article by H.S. Hall and R. E. Pondell, Chapter 7 in "Controlled Release Technologies: Methods, Theory and Applications", Volume II, A.F. Kydonieus, Ed, CRC Press, Boca Raton, FL, 1980. Unstabilized polypropylene homopolymer powder (produced by SHAC® 103 catalyst) having an average particle size of 610 micrometer and nominal 3 melt flow (ASTM D1238 condition L) was coated in a fluidized bed by a mixture of stabilizers and PP wax in a batch operation. The polypropylene wax served as a carrier of the additives to be incorporated into the base PP.

The polypropylene wax used was Hoechst Wax polypropylene 230 supplied by American Hoechst Corporation. This is predominantly isotactic polypropylene homopolymer with weight average molecular weight of about 25,000, softening point (Ring and Ball) or about 158° C. and viscosity at 180° C. of about 1 Pascal-second.

The stabilizer mixture was Irganox 3114 (Ciba-Geigy) and ZnO (New Jersey Zinc Co.) in the mass ratio 10:4. This mixture was dispersed (slurried) by stirring in molten polypropylene wax at 400° F. at two ratios, and the dispersion was sprayed or atomized by air upward through a heated nozzle onto a fluidized bed of unstabilized polypropylene particles. The nozzle was located at the base of the fluidized bed. The atomizing fluid which in this case was air, but could have been an inert gas, broke up the additive-containing molten wax into numerous droplets which were deposited onto the solid polypropylene particles.

The coating chamber used was conical, with 4-inch diameter at the bottom and 6-inch at the top. The stabilizer/wax mixture was delivered to the nozzle by a heated Zenith gear pump (1.75 cc/rev). There were two filters at the top of the chamber, in order to keep the fluidized polypropylene powder from blowing out. The coating conditions and test results for both examples are shown in Table 1. The fluidizing air temperature was controlled as indicated, in order to avoid fiber formation from the polypropylene wax.

EXAMPLE 1

13 gm of the stabilizer mixture was dispersed in 130 gm polypropylene wax. The fluidized bed initially contained 1500 gm unstabilized polypropylene powder, onto which 18.5 gm of the stabilizer/wax mixture was sprayed during the 5.8 minute coating run. This resulted in 1% polypropylene wax in the final stabilized polypropylene resin.

EXAMPLE 2

2 gm of the stabilizer mixture was dispersed in 225 gm polypropylene wax. During the 14.5 minute coating run 168 gm of the stabilizer/wax mixture was sprayed onto 1500 gm of unstabilized polypropylene powder in the fluidized bed. This resulted in 10% polypropylene wax in the final stabilized polypropylene resin.

After the fluidization bed coating was over, the polypropylene samples were compression molded into 10 mil thick plaques for thermooxidative stability measurement. Two methods were used, namely hot air oven aging and oxidative induction time or OIT. The longer oven life or OIT values indicate greater oxidative stability of the polypropylene.

In the first method 2 in x 2.5 in polypropylene plaques were aged in a forced circulation hot air oven maintained at 125° C., following the guidelines of ASTM D3012. The samples were inspected regularly, until failure was indicated by characteristic brittleness and powdery disintegration of polypropylene.

The OIT's were measured by a differential scanning calorimeter (Perkin Elmer model DSC 2), in which the polymer melt was oxidized by oxygen. In this test about 5 mg of the compression-molded polypropylene sample was crimped in the DSC. The sample was heated to the test temperature under nitrogen, and then the nitrogen gas was replaced by oxygen. From this time (t=0) onward, scanning was done in the time mode. A tangent was drawn to the exothermic oxidation peak. The intersection of this tangent with the initial baseline, measured from t=0, gave the oxidative induction time or OIT.

The results shown in Table 1 indicate that in both examples the coated polypropylene had significant oxidative stability, demonstrating effective stabilizer incorporation. For the unstabilized polypropylene containing 1% Hoechst Wax polypropylene 230, compression-molded and tested by the aforementioned procedure, the oven life was <1 day at 125° C. and the OIT was <1 minute at 190° C. For the unstabilized polypropylene containing 10% Hoechst Wax, the corresponding stability data were as follows: oven life of <1 day and OIT of 1.3 minute. These data show that the contribution of the Hoechst Wax to stability was negligible, and the stability of PP samples of examples 1 to 2 arose from the incorporation of stabilizers by the fluidized bed coating technique used.

It is contemplated that a second additive could be used in combination to the stabilizing additives listed above. The second additive may be a high molecular weight polymer, preferably compatible with the wax used herein. The weight average molecular weight can range between 50,000 and $10^6$ molecular weight and it could be used in the range from 0.001 to 0.005% preferably about 0.0025% by weight of the wax. For example, polyisobutylene, average mw 50,000 and polymethylmethacrylate (850,000 average mw) may be usable as this second additive.

ments, including titanium dioxide, carbon black, lead chromate, cadmium sulfide, cadmium selenide, and zinc sulfide; stabilizers including basic lead carbonate, tribasic lead sulfate, basic lead chlorosilicate, dibutyl tin

TABLE 1

| | FLUIDIZED BED COATING RUN CONDITIONS AND PP STABILITY TEST RESULTS | | | | | | | | |
|---|---|---|---|---|---|---|---|---|---|
| PP Sample | Fluidizing air temp (°F.) in / out | Pressure of atomizing air (psi) | Flow rate of atomizing air (SCFH) | Wax line temp (deg F.) | Nozzle temp. (deg F.) | Nominal stabilizer conc (ppm) in PP | % Wax in PP | Oven life (days) at 125° C. | OIT (min) at 190° C. |
| Example 1 | 289  167 | 20 | 89 | 460 | 350 | 1171 | 1 | >200 | >20 |
| Example 2 | 287  186 | 20 | 85 | 460 | 340 | 1000 | 10 | >200 | >20 |
| Unstabilized PP | —  — | — | — | — | — | 0 | 0 | 1 | 1.1 |

The process of the present invention can be advantageously employed to efficiently produce coated, stabilized resin particles (like polypropylene) containing additives with the minimum expenditure of man hours and minimum equipment costs. The stabilized coated polymer particles produced by the teachings of this invention is directly salable to customers, and are relatively dust-free, without significant presence of fines.

What is claimed is:

1. A process for post-reactor stabilization of polyolefins comprising:
   melting a polyolefin wax (that is forming a liquid);
   blending at least one additive into the liquid polyolefin wax;
   fluidizing polyolefin particles to be stabilized with a hot gas;
   spraying the liquid polyolefin wax containing at least one additive on the fluidized polyolefin particles, and forming at least partially coated polymer particles;
   maintaining the at least partially coated polymer particles and fluidized polyolefin particles at a temperature which is sufficiently high to prevent the formation of fibers from the wax and which enhances the formation of stabilized polymer particles.

2. The process of claim 1, wherein the polyolefin to be stabilized comprises a member of the group: a polyolefin homopolymer having 2-18 carbon atoms in the repeat unit, and a polyolefin copolymer having at least one comonomer with 2-18 carbon atoms.

3. The process of claim 2, wherein the polyolefin is a member of the group: polypropylene, polybutylene, and polyethylene.

4. The process of claim 1, wherein the additive is a member of the group comprising antioxidants, processing stabilizers, acid acceptors, nucleating agents, metal deactivating agents, thermal stabilizers, light or ultraviolet stabilizers, lubricants, antiblock agents, antistatic agents, and slip agents; fillers, including talc, barium sulfate, clays, calcium carbonate, silicates, mica; pigments, including titanium dioxide, carbon black, lead chromate, cadmium sulfide, cadmium selenide, and zinc sulfide; stabilizers including basic lead carbonate, tribasic lead sulfate, basic lead chlorosilicate, dibutyl tin oxide and other salts of lead, zinc, cadmium, tin; flame retardants including antimony oxide; and other additives which enhance the properties and processability of the polyolefin to which they are added:

5. The process of claim 1, wherein said fluidization of the polyolefin particles is performed using a member of the group comprising of heated air, heated inert gas, and heated mixtures thereof.

6. The process of claim 5, wherein the liquid polyolefin wax is at a temperature between about 50° C. and about 210° C.

7. The process of claim 1, wherein said liquid wax has a residence time with the fluidized polyolefin particles of between about 0.5 minutes and about 20 minutes.

8. The process of claim 1, wherein the polyolefin wax component comprises a polyolefin having 2-18 carbon atoms in the repeat unit.

9. The process of claim 1, wherein the polyolefin wax is polypropylene wax.

10. The process of claim 1 further comprising disposing at least a second coating onto said at least partially coated polymer particles.

11. A process for adding stabilizers to polypropylene particles comprising:
    melting a polypropylene wax (that is, forming a liquid);
    blending at least one additive into the liquid polypropylene wax;
    fluidizing polypropylene particles to be stabilized with a hot gas;
    spraying the liquid polypropylene wax containing at least one additive on the fluidized polypropylene particles, and forming at least partially coated particles of polypropylene; and
    maintaining the at least partially coated particles of polypropylene and fluidized polypro particles at a temperature which is sufficiently high to prevent the formation of fibers from the wax and enhances the formation of stabilized polypropylene particles.

* * * * *